United States Patent [19]

Kashyap

[11] Patent Number: 5,022,734
[45] Date of Patent: Jun. 11, 1991

[54] METHOD OF MODIFYING AN OPTICAL WAVEGUIDE AND WAVEGUIDE SO MODIFIED

[75] Inventor: Raman Kashyap, Ipswich, England

[73] Assignee: British Telecommunications public limited company, England

[21] Appl. No.: 348,700
[22] PCT Filed: Sep. 21, 1988
[86] PCT No.: PCT/GB88/00775
§ 371 Date: May 1, 1989
§ 102(e) Date: May 1, 1989
[87] PCT Pub. No.: WO89/02334
PCT Pub. Date: Mar. 23, 1989

[30] Foreign Application Priority Data

Sep. 21, 1987 [GB] United Kingdom ............ 8722200

[51] Int. Cl.$^5$ .................... G02B 6/26; G02B 6/42
[52] U.S. Cl. .................... 350/96.15; 350/96.19
[58] Field of Search ............ 350/96.34, 96.19, 96.31

[56] References Cited

U.S. PATENT DOCUMENTS

| | | | |
|---|---|---|---|
| 3,909,110 | 9/1975 | Marcuse | 350/96.31 |
| 4,505,542 | 3/1985 | Clarke | 350/96.34 |
| 4,725,110 | 2/1989 | Glenn et al. | 350/96.19 |
| 4,807,950 | 2/1989 | Glenn et al. | 350/96.19 |

OTHER PUBLICATIONS

"Multimode CW Nd:YAG Laser Beam Transmission through the Fiber Optic Delivery System" by Jankiewicz SPIE vol. 670 Optical Fibers and their Applications IV (1986).
Optics Letters, vol. 12, No. 8, Aug. 1987, Optical Society Of America, P. L. Baldeck et al.: "Observation of Self-Focusing in Optical Fibers with Picosecond Pulses", pp. 588-589.
Physical Review Letters, vol. 27, No. 14, 4 Oct. 1971, C. R. Giuliano: "Observations of Moving Self-Foci in Sapphire", pp. 905-908.
GEC Journal of Science & Technology, vol. 45, No. 3. 2979, R. M. Wood "Laser Damage in Optical Materials at 1.06 um", pp. 109-115.
Optical Engineering, vol. 17, No. 5, Sep./Oct. 1978, W. Lee Smith: "Laser-Induced Breakdown in Optical Materials", pp. 489-503.
Soviet Journal of Quantum Electronics, vol. 4, No. 8, Feb. 1975, American Institute of Physics, (New York, US), Yu. K. Danileiko et al.: "Role of Absorbing Defects in the Mechanism of Laser Damage of Real Transparent Dielectrics", pp. 1005-1008.

Primary Examiner—Akm Ullah
Attorney, Agent, or Firm—Nixon & Vanderhye

[57] ABSTRACT

A method of structurally modifying a silica monomode optical fiber (4) by launching optical power into the fiber (4) from an Nd:YAG laser operating at 1.064 um and raising the temperature of a portion of the fiber (4) by bringing a metal film (12) into contact with a polished half-coupler block (6) to absorb energy from the laser (2). A structural modification of the fiber is initiated which propagates towards the laser (2) sustained by the optical power. It provides a means of decommissioning an optical fiber. The modified optical fiber (4) has regular periodic damage sites which can be used to form a diffraction grating. The method may also be used as an optical power limiter to protect optical networks from too high optical power inputs.

16 Claims, 6 Drawing Sheets

FIG. 4
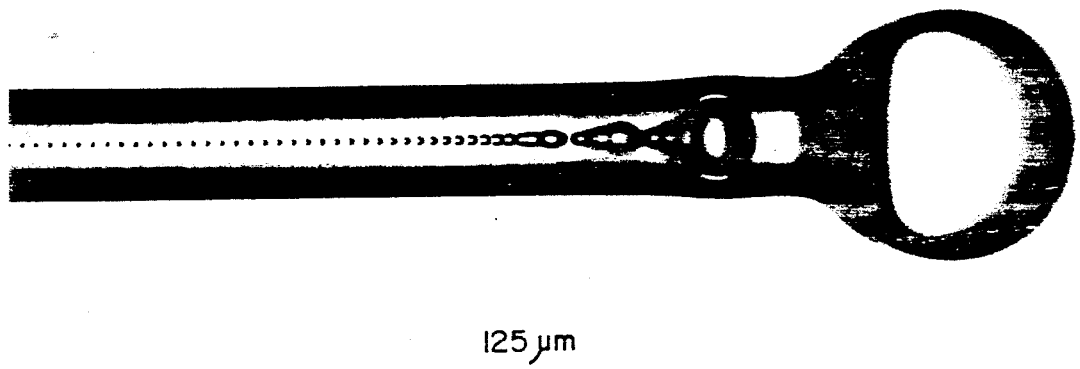
125 μm
FIG. 5
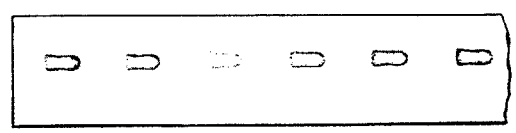
FIG. 6
10 μm
FIG. 7
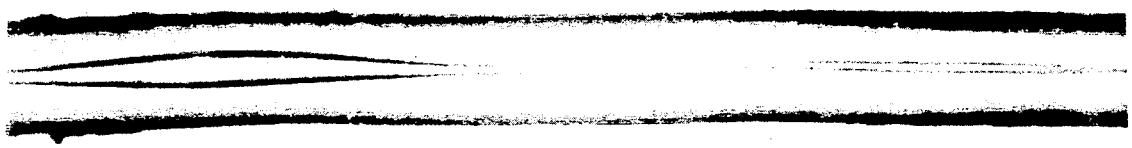

RAMAN SPECTRA OF GAS IN 4μm CAVITY FORMED BY THE DAMAGE SHOWING A PEAK OF OXYGEN AT 1555 cm$^{-1}$

VELOCITY OF DAMAGE PROPAGATION AS A FUNCTION OF POWER IN CORE FOR THREE FIBRES A,B & C.

VELOCITY OF DAMAGE PROPAGATION AS A FUNCTION OF POWER-DENSITY IN CORE FOR THREE FIBRES, A,B & C THRESHOLDS ARE INDICATED BY a,b & c RESPECTIVELY.

THE ABSORPTION IN SINGLE-MODE FIBRE AS A FUNCTION OF TEMPERATURE.

DATA ON UNEXPANDED AND EXPANDED SCALE RECORDED ON TRANSIENT DIGITISER SHOWING PERIODICITY IN EMISSION OF LIGHT DURING FORMATION OF CAVITIES. ALSO SHOWN IN THE INSET IS THE REGION OF THE FIBRE FROM WHERE THE EMISSION WAS CAPTURED. THE CAVITY SEPERATION IS ABOUT 33μs.

TEMPORAL DEPENDENCE OF CAVITY FORMATION 'a' IS DATA FOR cw POWER, 'b' FOR 190ps AND 'c' FOR 100ps FWHM PULSES. ALL DATA IS FOR 2 WATTS AVERAGE.

METHOD OF MODIFYING AN OPTICAL WAVEGUIDE AND WAVEGUIDE SO MODIFIED

BACKGROUND OF THE INVENTION

This invention relates to optical waveguides, and, amongst other things, to a method of modifying the core of an optical fibre, and an optical fibre so modified.

Field of the Invention

The high damage threshold of single-mode silica fibre ($>10$ GW cm$^{-2}$) has allowed the use of optical fibres for several nonlinear effects such as Raman amplication soliton generation, ultrafast optical gates and second harmonic generation. The first experimental observation of self-focusing in multimode fibres using high-peak power pico-second pulses has been reported, but no damage to the fibre was observed. Optical damage mechanisms involve stimulated Brilluion scattering or dielectric breakdown at high field strengths using Q-switched and mode-locked lasers. Damage to optical fibres usually occurs at the launch end, where there is a finite probability of encountering contamination which then absorbs the laser energy causing the end to melt, through intense stimulated scattering process or at end fractures. Optical damage of fibres is of great concern to designers of power delivery systems in medicine and industry, and of high bit-rate non-linear devices. Power delivery systems, too, generally suffer end damage, and care needs to be taken in the safe design and operation of the fibre cables Baldeck P. L, Raccah F. & Alfano R. R., Opt. Letts., 12(8), August 1987.

SUMMARY OF THE INVENTION

According to a first aspect of the present invention a method of modifying the optical structure of a waveguide comprises launching optical power into the waveguide and raising the temperature of a portion of the waveguide, the optical power and temperature rise being sufficient to initiate and sustain the propagation of a structural modification along the waveguide towards the source of the optical power.

In this context, the term "optical" is intended to refer to that part of the electromagnetic spectrum which is generally known as the visible region together with those parts of the infrared and ultraviolet regions at each end of the visible region which are capable of being transmitted by dielectric optical waveguides such as optical fibres.

Once initiated in the heated portion of the waveguide, the optical power delivered to that portion eventually recreates at a point near the optical source the conditions necessary for local absorption of power from the laser. There is then a large local heating at the new location which similarly causes absorption at a point yet nearer the optical source. The enhanced local absorption in the waveguide is associated with damage to the waveguide and a consequent local modification to the optical properties of the waveguide, in particular its transmissivity. The propagation of the local modifications continue as long as sufficient optical power continues to be launched into the waveguide.

The progress of the propagation can be followed by eye when the waveguide is an optical fibre since the region where the optical power is being absorbed at a given time emits intense light through the cladding. The region of localised light emission travels along the fibre towards the optical source as fibre core is progressively modified. It requires low peak powers (0.5 watts, 3 MWcm$^{-2}$) is silica mono-mode fibres, and once initiated, propagates unimpeded towards the source with devastating results for the transmission medium.

The temperature of the waveguide can be raised in a variety of ways to initiate the propagation modification. An external heat source can be applied, for example by applying a fusion splicer normally used for splicing optical fibres together. Alternatively an absorbing material can be placed in the optical field for example by placing a substrate with a metal film on it into contact with the fibre at a polished fibre half-coupler block (it is thought the optical field vaporises the metal film causing local heating of the fibre) or by placing the end of an optical fibre against an absorbent material so the optical power is absorbed to create local heating at the fibre end.

In the case of an optical fibre, the modifications comprise regularly spaced, bullet shaped damage centres a few microns in dimensions and spaced a few microns apart, a novel configuration which may find application in the production of diffraction devices.

Once initiated the periodic damage can propagate back to the source of the optical power as the waveguide losses will be smaller the nearer it is to source. The effect has been initiated at the end of a 1.5 km length of optical fibre. The method finds immediate practical application in the decommissioning of an optical fibre, i.e. ensuring for example, that a damaged optical fibre is rendered completely unusable so preventing inadvertant connection of a sub-standard fibre without the need to physically remove the fibre.

According to a second aspect of the present invention, the structurally modified fibre may also find application as a basis for optical devices.

An optical fibre, for example, so modified could be polished to expose the periodic modification to form a diffraction grating.

The slowly travelling (about 1 ms$^{-1}$) light emission from an optical fibre during modification could find application in special effects in the entertainment industry.

BRIEF DESCRIPTION OF THE DRAWINGS

The invention will now be described with reference to the accompanying drawings in which—

FIG. 4 is a reproduction of a photograph of an optical fibre showing a fusion splicer initiated, periodic modification;

FIG. 5 is a reproduction of a photograph showing the periodic modification of the fibre or FIG. 4;

FIG. 6 is a reproduction of a photograph showing the periodic modification of a D-fibre;

FIG. 7 is reproduction of a photograph showing a capillary formed from a fibre modified according to the present invention;

DETAILED DESCRIPTION OF THE DRAWINGS

Figure 1:
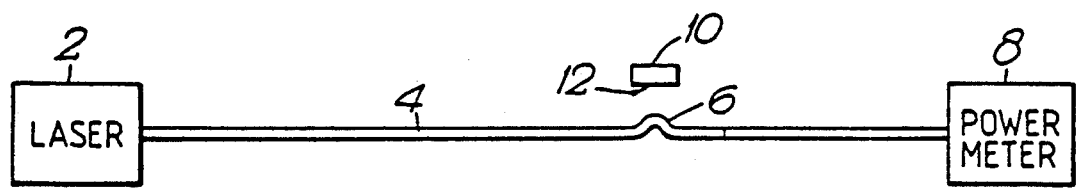
FIG. 1 is a schematic diagram of apparatus suitable for modifying an optical fibre according to the present invention.

Referring to FIG. 1, the output from a mode-locked Nd, YAG laser 2 operating at 1.064 μm is launched into a short length of single-mode silica fibre 4 with an polished fibre half coupler block 6 (HCB) at some point along its length. The output power is monitored by a power meter 8. A substrate 10 with a metal film 12 on it is brought into contact with the fibre at the HCB. At this point, an intense blue-white flash can be seen departing from the HCB and propagating along the fibre 4 towards the launch laser 2. The output power at the power meter 8 immediately drops to zero.

Figure 2:
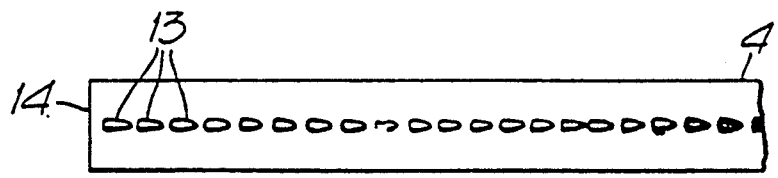
FIG. 2 is a reproduction of the core of an optical fibre after modification.
Figure 3:
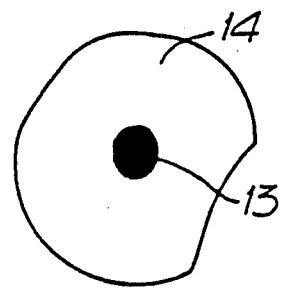
FIG. 3 is reproduction of a photograph of the end of the optical fibre of FIG. 2.

The resultant fibre structure of a silica optical fibre in the manner modified as seen under a microscope is shown in FIG. 2. Examination of the fibre has shown some interesting features. The entire length of the fibre 4 from the HCB 6 to the launch end was altered radically and the HCB 6 showed signs of optical damage. At the beginning of the damage, there appeared to be a tapering section, indicating catastrophic termination of optical propagation. There also appeared to be perforation and loss of a very small amount of the core material. Immediately following this region, was a rapid evolution of periodic damage centres 13, a few microns in dimensions, as shown FIG. 2. These are bullet shaped and are regularly spaced over the fibre's length. These damage centres have been determined to be hollow. It is thought that local heating of the region makes the hollows expand rapidly and coalesce forming a capillary. A photograph of the end 14 of the damaged fibre of FIG. 2 is shown in FIG. 3. A noteworthy feature is the apparent increase in the core diameter, from 4.7 μm (undamaged) to about 9.7 μm. The damaged fibre end 14 shows a small cylindrical region in the centre which appears to be highly reflective. This is due to the interface between the glass and the hollow cylinder behind. There is also a slight darkening of the region immediately around the core.

Normally, an optical fibre can propagate several watts of power without causing damage to the core. When damage occurs, the power output decreases rapidly, following the breaking up of the input face either through Brillioun scattering or physical damage due to local heating. This normally happens after long periods of transmission, or with the use of Q-switching. In the present case the average power output was approximately 2 watts, giving a peak power density of about 1 GW cm$^{-2}$, which is well below the optical damage threshold in silica.

The fibre damage is, in places, very similar to that seen in self-focusing damage in bulk with filament formation and multiple focusing centres (see Giuliano, C. R. & Marburger, J. H., Phys Rev Letts, 27 (14), Oct. 4, 1971) but the known theory applicable to bulk materials does not appear to explain the periodic filament formation according to the method of the present invention. The periodic filament formation in bulk media is confined to a relatively short lengths, since diffraction ensures beam divergence and termination of the effect. In a waveguide, once a critical threshold for localised damage is exceeded, the applicant has found that there is then the possibility of propagation of the effect, provided the damage can propagate as well. Thermal self-focusing shows effects of filament motion towards the source but it is not clear if this is the cause here. The basic driving force in the present process is the delivery of energy from the laser to generate a local effect. The slight darkening of the region immediately surrounding the damage centre indicates possible reduced germania and/or silica, i.e. GeO, SiO respectively, which are both dark in appearance.

Referring to FIG. 4 there is shown the end of a fibre after the fusion-arc is struck. The spherical end of the fibre due to surface tension on melting is followed by a large drop shaped cavity. Successively smaller cavities are formed as a result of the temperature gradient, until after some distance, the damage stabilises to a more or less periodic restructuring of the core throughout the length of the fibre, and is shown in to FIG. 5.

There appear to be several possible explanations for the observation of this effect. The conditions for initiation point to energy related effects. The process has to be started in such a way that the once transparent medium (the fibre waveguide in the above example) is made highly absorbing or that there is a large increase in the real part of the non-linear refractive index. It is well known that dielectrics can become highly absorbing after a phase transition, for example moving from the liquid to the vapour phase. There is evidence that a local temperature increase at the initiation point occurs which exceeds the glass melting temperature at about 1700° C., of the fibre core. It is through this could lead to a massive increase in absorption, which in turn increases the temperature further. The intensity of the emission from the fibre at the propagating damage site indicates that there may be plasma formation due to dielectric breakdown in the core region. This may generate the propagation mechanism for a heating front through plasma heating causing the absorption point to move towards the laser source. If the absorption coefficient, a, is large, then the oncoming laser radiation will be absorbed in a distance of order $a^{-1}$. This need not be immediately in contact with the previous absorption centre and if not it would lead to the separation of the damage centres shown in FIG. 2. In the case of a propagating non-linearity, a similar description would also apply. The dynamics of the process will of course depend on the exact nature of the mechanism but it will be understood that the present invention does not rely on the correctness of the above analyses.

Another possible mechanism for the process may be to cause excited state absorption. The initiation process causes intense radiation which probably spans the energy of the excited state, at around 250 nm, of the core dopant, $GeO_2$. This could cause an increase in nonlinear refraction and absorption, hence leading to a similar process.

Several experiments have been done with fibres of different mode field widths and input power. Initial results show that there is a threshold intensity for the process to be sustained. This was measured to be about 300 MW cm$^{-2}$. The effective nonlinearity, can thus be calculated on the assumption that self-focusing is occurring and this is $7 \times 10^{-16}$m$^2$v$^{-2}$, which is very large compared to that of silica although it is likely to be slow. The process was also able to be initiated from the far end of 1.5 km of single-mode fibre and stopped soon after, demonstrating the possibility of damaging long lengths of fibre. In another experiment, 150 m of fibre was completely modified, this being the longest length yet tried.

The process can be initiated in several different ways. Contact of the exit of the fibre 4 with an appropriate metal surface can generate the conditions required to form the initial filament. An arc-fusion fibre-joining machine can also produce the starting point where the fusion arc is struck, contact of the exit end of the fibre with vinyl floor covering has also been found to initiate the modification process. In appears that any absorbing material capable of generating high temperature is adequate for the purpose. However, the starting process is not fully understood and is being investigated at present. The heat can be generated by an external source or by causing energy absorption from the optical power launched into the waveguide.

A very rough model of heat flow, assuming no heat loss as a result of conduction or radiative diffusion, shows excellent agreement with measured data. The model assumes the heating of a small localised damage centre to the point of vaporisation to a temperature of 3000° C. The dimensions of a damage centre vary with input power. Measured data showed 10$^5$ such centres in a metre, each of about $2 \times 10^{-15}$m$^3$, for an input power of 1 Watt. The velocity of travel in ms$^{-1}$ is thus given by, $$V = E/V\rho cN$$

where, V is the volume of the centre, $\rho$, the density of glass, c, the specific heat capacity, N the number of centres per meter, and E the input energy. This gives a calculated velocity of travel of the damage centres of about 1 ms$^{-1}$, which is close to the measured velocity. About 750 pulses of 100 ps FWHM over a period of approximately 10 us are required to form each damage centre. The crude model does not take into account the sublimation energy of silica, nor the change with temperature of the specific heat capacity of the material. These changes are likely to affect the final result by a small amount, since the heating can be assumed to be almost instantaneous and at constant volume. Referring to FIG. 6 there is shown the periodic restricting of the fibre core after damage for a fibre in which the cladding has been removed nearly exposing the core, as in a D-shaped fibre. The cavities are shaped more like arrow heads. The shape of the damaged cavities is dependent on the state of the fibre so heat diffusion must, therefore, govern the formation of the shape of the cavities. There is evidence to suggest that GeO$_x$ and SiO$_x$ are formed as a result of the damaged process, with oxygen being liberated in the cavity. Subsequently heating a section of fibre locally causes the damage centres to coalesce forming a capillary as shown in FIG. 7. The sudden expansion on heating of the cavities indicates that they are probably under some pressure.

Figure 8:
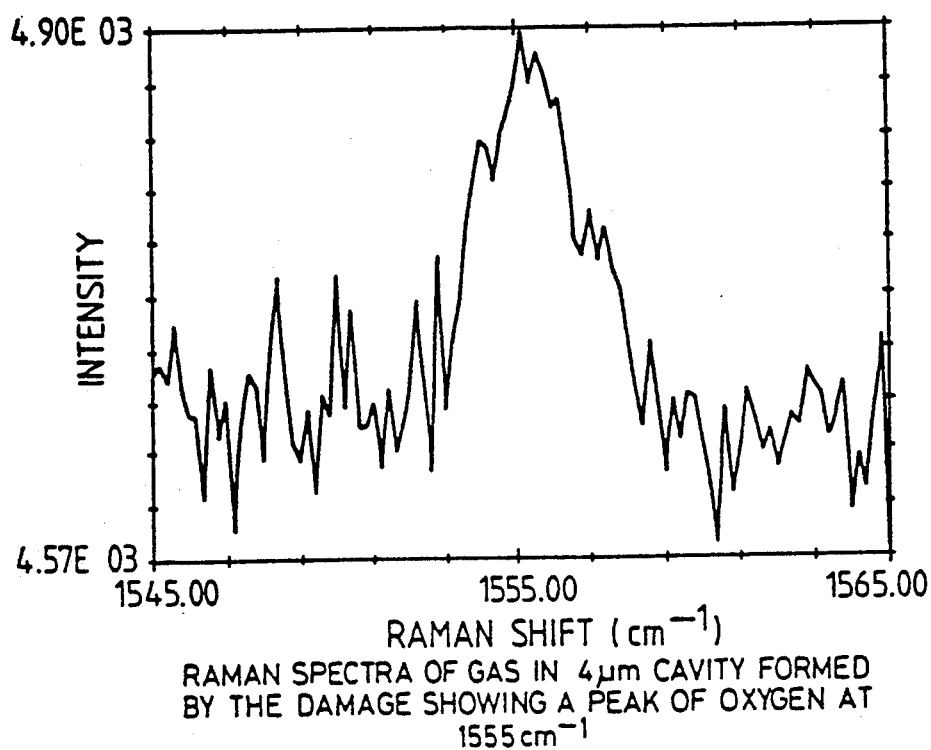
FIG. 8 is a graph of the Raman spectra of the gas in a cavity of a modified fibre.

Micro-probe Raman studies were undertaken to detect the gases and identify the presence of sub-oxides. Initial results have shown that the cavities contain molecular oxygen at roughly 4 atmospheres pressure. The Raman spectra is shown in FIG. 8 in which the characteristic vibrational band of oxygen at 1555 cm$^{-1}$ is clearly resolved. The pressure was estimated by comparing the area under the curve with the spectra of atmospheric oxygen.

A cw mode-locked Nd: YAG and an Argon laser were used to investigate the velocity of propagation of the damage process. The output of the laser was launched into a single-mode fibre using an optimised arrangement which enabled the continuous variation of both the numerical aperture and spot-size. An efficient launch into different types of single-mode fibre was thus possible. An optical attenuator comprising a $\lambda/2$ plate and polariser was used to select the launched power. The fibre was held in a silica V-groove in order to minimise thermal drift due to local heating of the fibre holder. The output was monitored by a power meter before each measurement. Two small area RCA silicon photodiodes was integrated fibre apertures, were placed one metre apart close to the output end of the fibre, which was stretched between them. The outputs of the photodiodes were used as triggers to start/stop an interval counter.

Three fibre A, B & C were used to compare propagation characteristics. The details of the fibres are shown in Table 1. The index profile, the core-cladding index difference. $\Delta$n and the core radius were chosen to be different. These parameters determine the mode-field width of the optical power launched into the fibre at the laser wavelength. Several measurements were made with a Nd:YAG laser operating at 1.064 $\mu$m, both cw and mode-locked at average power levels varying between 0.7 to 2.4 watts. With an Argon laser operating at 514 nm measurements were made on fibre B for cw operation of powers ranging between 0.5 to 2.25 watts.

TABLE 1

| | | data on fibres | | |
|---|---|---|---|---|
| Fibre | Profile | Peak delta-n | Core diameter | Spot size at 1.064 $\mu$m |
| A | step | $4 \times 10^{-3}$ | 8.05 $\mu$m | 6.04 $\mu$m |
| B | triangle | $5.48 \times 10^{-3}$ | 5.40 $\mu$m | 4.86 $\mu$m |
| C | triangle | $8 \times 10^{-3}$ | 5.40 $\mu$m | 3.94 $\mu$m |

For the measurements described in here, the process was initiated in two ways. An arc-fusion jointing machine was used to generate a high temperature at the output end of the fibre which was simultaneously carrying the laser power, or self-started by the heat generated on contacting the output end of the fibre with a painted or metalised surface. At 1.064 $\mu$m the initiation of the process was obvious, since an intense blue-white localised filament was seen propagating toward the launch end in the fibre. At 514 nm, the phenomenon is masked by the intense scattered visible laser radiation which, too, propagates backwards. However, the plasma-like emission is visible through the Argon line-blocking safety glasses. The start/stop trigger pulses are detected by the photodiodes as a result of the scattered radiation for both wavelengths.

Figure 9:
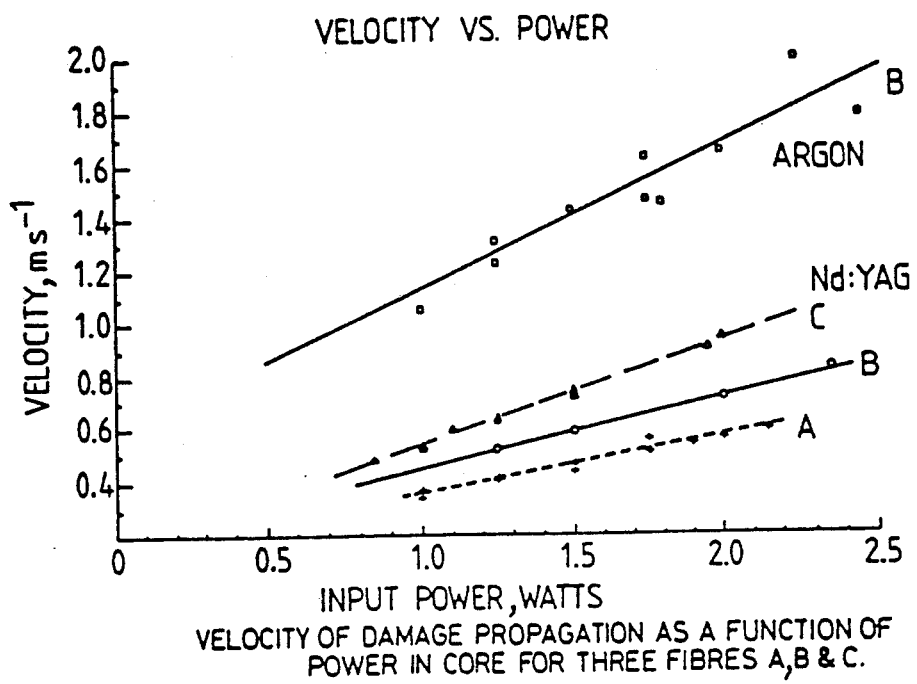
FIG. 9 is a graph of the velocity of propagation of the fibre modification as a function of core power.

Damage Propagation:

In all over 70 measurements were performed and averaged. The data plotted in FIG. 9 shows the velocity of propagation for each fibre with respect to output optical power, showing the linear relationship with different slopes. However, when the data is plotted with respect to power-density in the core, as shown in FIG.

10, there is a linear relationship with respect to the average power density in the core. The slopes in this case are virtually identical. The conclusion drawn is that the energy density required to cause the phenomenon is approximately constant for all the fibres. The slope is about $5 \times 10^{-12}$ m$^3$ J$^{-1}$.

Figure 10:
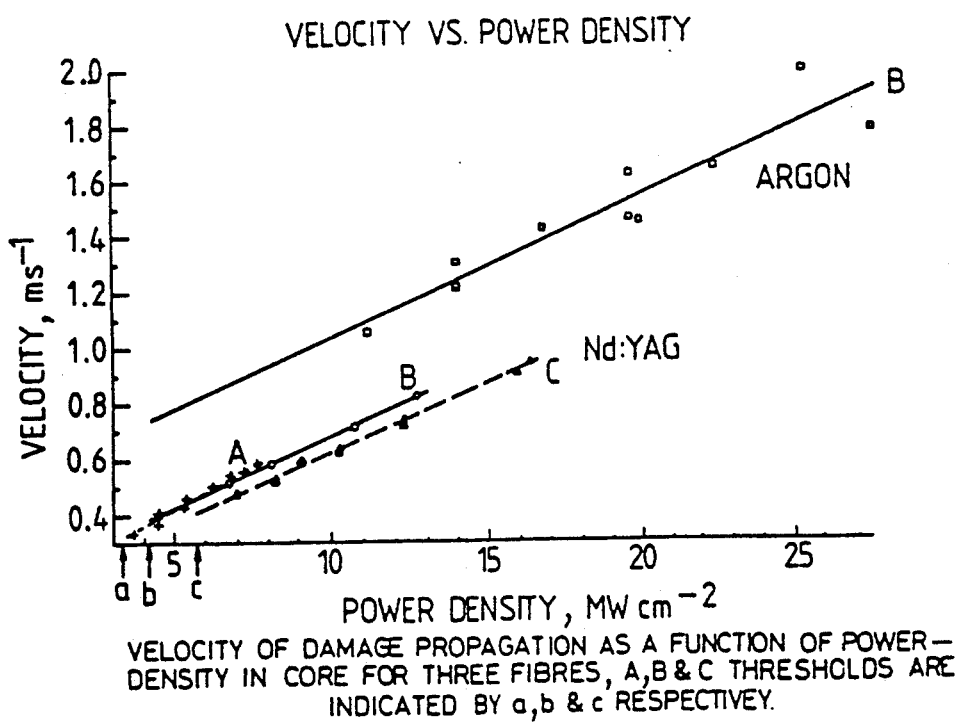
FIG. 10 is a graph of the velocity of propagation of the fibre modification as a function of core power density.

Based on the length of the damage centre of 5 μm and a net absorption of 5Δ of the source power, the absorption coefficient, α, is calculated to be around 100 cm$^{-1}$. The change in absorption as reflected by, α, indicates that the absorption is unlikely to be due to colour centre formation, since the absorption levels are far too large. It is believed to be part due to avalanche ionisation or increase in the conductivity of silica at elevated temperatures. Since the heat flow model is complex, a simple heat absorption calculation was performed to estimate the temperature rise, using the measured data presented here and, published data on the temperature dependence of the specific heat of silica and, allowing for the fusion energy for the formation of the sub oxides of germanium and silicon. This is around 2500° C. However, a dynamic thermal-diffusion model using a finite element technique is being attempted to analyse the problem numerically, and will be reported elsewhere. Thresholds for sustaining the process were measured by reducing the input power until the damage propagation ceased. The thresholds are a function of the heat-diffusion time-constants which are inversely proportional to the square of the mode-field-width. Thus different thresholds for each fibre are expected. The accurate measurement of thresholds was difficult, owing to the coarse movement on the attenuator. However, the power density below which the damage was unable to propagate is indicated in FIG. 10 for each fibre. The minimum level was about 3.2 MW cm$^{-2}$ corresponding to a minimum power of about 0.7 watts CW for fibre B.

The data for 514 nm is also shown in FIG. 10. The presence of higher-order modes at the shorter wavelength makes normalisation difficult. The scatter in the data is the result of estimated field-widths used for calculating power-density. Again, the slope is identical to the YAG measurements, indicating similar functional behaviour. The threshold was in excellent agreement with the 1.064 μm measurement data for fibre A.

Figure 11:
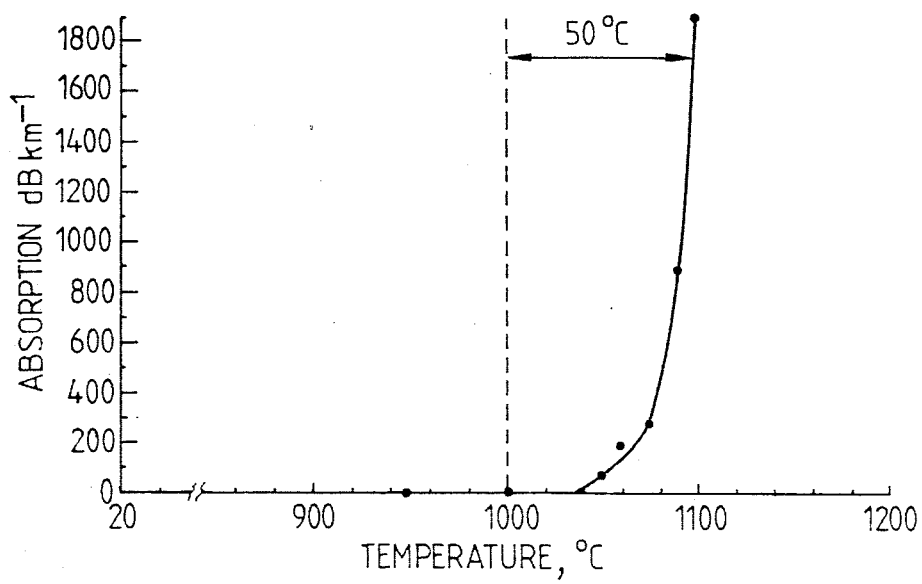
FIG. 11 is a graph of the absorption in single mode fibre as a function of temperature.

Nonlinear Absorption:

The mechanism involved in causing this phenomenon was thought to be related to increased absorption with temperature. Experiments were undertaken to measure the change in the throughput of a single-mode fibre, while the fibre was heated in a furnace. A one metre length of fibre was heated up to a temperature of 1100° C., while monitoring the output power. The launched power at 1.064 μm was deliberately kept low so that increasing absorption with temperature would not cause erroneous results through optical heating. FIG. 11 shows the attenuation as a function of temperature. There is sharp increase in the loss around 1050° C. Within 50 degrees, the attenuation increases by nearly 2000 dB km$^{-1}$ (~$4.6 \times 10^{-3}$ cm$^{-1}$). At slightly elevated temperatures this seemingly exponential rise in attenuation would cause the power in the guided mode to be absorbed strongly over a very short length. It is thought that there is a corresponding increase in the third-order nonlinearlity which causes self-focusing.

Periodic Emission:

Another experiment was performed on fibre B to detect the periodic formation of the damage centres. It was postulated that the plasma-like emission must have a modulation which would be a function of the rate of formation of the cavities. The fibre was inserted into an aluminium housing through a fine-bore capillary, so that it passed in front of a photo-multiplier tube (PMT), and out again through another similar capillary. The aluminium housing thus formed a light-tight enclosure for the PMT. With the power launched into the fibre, the damage was started just beyond the exit capillary of the housing. The output of the PMT was displayed on a 125 MHz transient digitising oscilloscope, which recorded the data as the damage swept across the face of the PMT. Filters were inserted in front of the fibre to adjust the light level incident on the PMT to ensure linearity of the output.

Figure 12:
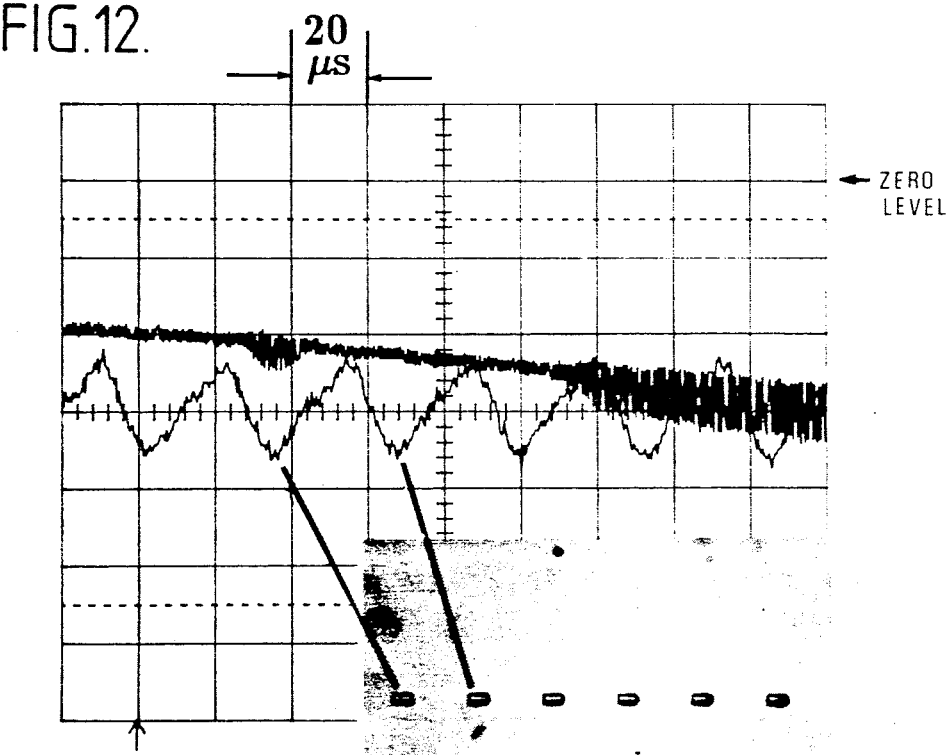
FIG. 12 is a graph of the periodicity of light emission from a fibre during modification of the core.

Several attempts were made to capture the modulation. The measurements proved to be temperamental, but the structure on the output did correllate with the damage centres. FIG. 12 shows the transient digitising oscilloscope output, both unexpanded and in a smaller time window. The modulation of the light emission can be seen on a background of ambient emission, but with a small modulation-depth. This was not unsurprising; it is likely that the dynamic temperature variation remains small since the emission temperature is dominated by heat diffusion, which would tend to reduce the fluctuations.

The temporal separation between the centres as determined from measurements made on propagation velocity was approximately 33 μs (shown in the inset) for the power launched into the fibre. The measured modulation in the plasma-like emission also had a period of 33.3 μs, in good agreement with the periodicity of the damage centres.

Figure 13:
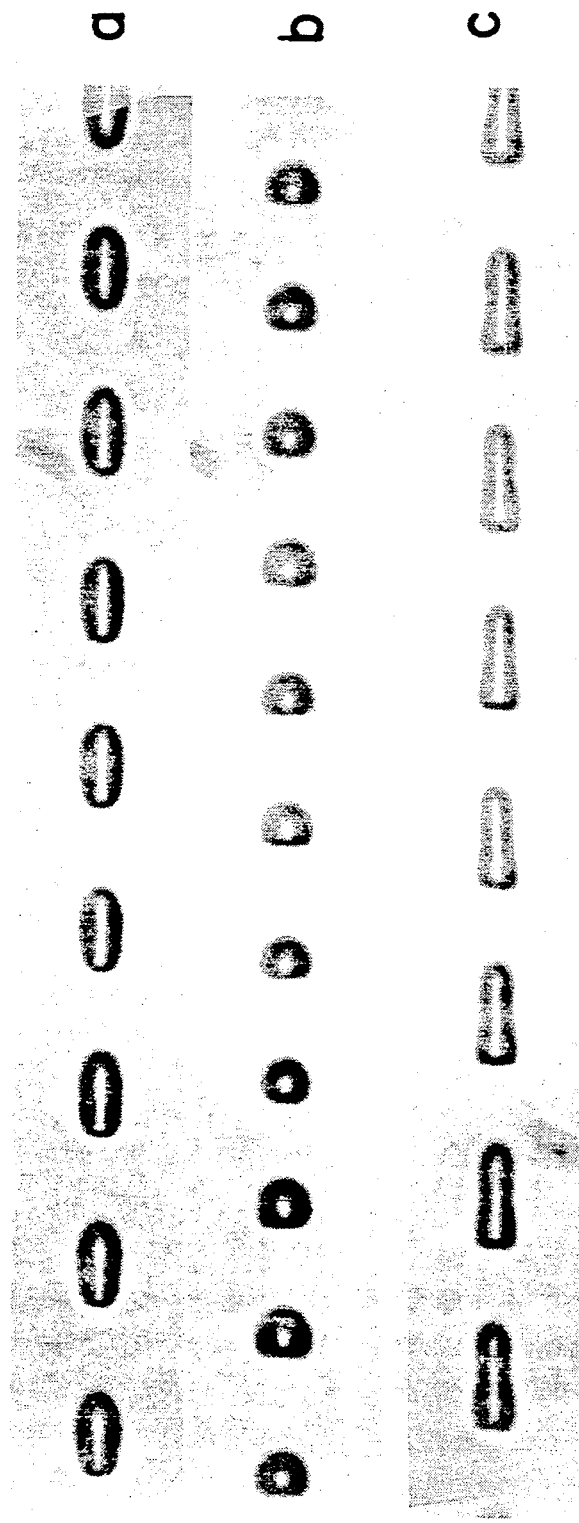
FIG. 13 is a reproduction of a photograph of core modification for three different optical power regimes.

Temporal Effects:

Mode-locking has little effect on the velocity of damage propagation for all three fibres, but does alter the shape of the damage centres slightly. It is difficult to assess accurately the relationship between their shape, the optical pulse-widths, and the average power. But it is related to the thermal-diffusion time-constants and probably low frequency statistical fluctuations in the optical power density and local, but periodic, variations in the waveguide. It is possible to observe qualitatively the variation in the formation of the cavities with respect to the input power conditions. FIG. 13a shows the type of cavities which are formed, separated by 14.8 μm when the input power is 2 watts CW for fibre A. The cavities are large drop shaped with a rounded front end. They have however, a sharp truncated tail end. The sharp boundary at the tail end is a type of feature observed in all samples examined so far. For 190 ps (FWHM) mode-locked pulses, the cavities are larger in diameter, albeit shorter in length (FIG. 13b). Finally, for 100 ps mode-locked pulses, the cavities become bell like with a longer pointed end but with a smaller average diameter (FIG. 13c). Theser observations show that the effect is sensitive to the temporal characteristics of the input optical power, down to the narrowest pulses of 100 ps FWHM used in our experiments. It is concluded that the nonlinearity is likely to have a fast response, possible in the picosecond region.

These observations raise serious questions as to the operational safety and testing of optical guide-wave devices and power-delivery systems. The average power density in the fibre was about 10 MW cm$^{-2}$. Consequently, it puts a very low limit to the average power density in single-mode guided-wave devices, about which they will be potentially at risk of destruction. For low melting point device materials, the limit is likely to be even lower. The mechanism is also likely to be manifest in other waveguide structures such as those used in integrated-optics, and especially prone will be power delivery systems.

This phenomenon does, however, allow the investigation of laser damage processes in different materials in a 'controlled' manner. It would also allow damage investigation of specific materials by their introduction in the core of waveguides. Sandwiching thin slivers of new materials between the ends of optical fibre during the damage process may allow assessment of their suitability for optical devices.

Many fibre based applications areas using high average powers are susceptible to catastrophic damage. A type of optical-device structure using the evanescent field interaction with overlays of metals or non-linear materials, such as the fibre half-coupler block, must be used with core with high average powers to ensure its integrity. The fast growing field of fibre-lasers is another area where there could be a potential hazard, since the pump and cavity powers used can be high. Future fibre-lasers may well generate high powers, and thus be susceptible to such damage.

A more fundamental question arises on the origins of the absorption mechanism. The absorption is estimated to be modest. The present estimate suggests only a fraction of the optical power (5Δ) is being absorbed. It this were to change, for example, by the introduction of dopants or by the use of other device materials then the threshold can potentially be in the milliwatt region, causing concern for many device users.

There are further possible applications of this effect. In a high temperature plasma is generated in the core of the fibre, then for example, it could have application in the probing of small voids filled with gases deliberately placed in the core of the fibre. Observations of gas-plasma interactions could be made as the plasma propagated through the void. The temperature of the plasma could be varied by changing the power density in the core. At present, the generation of the effect is easy and consistent.

An optical fibre modified to produce regular periodic structural modifications may find application in the manufacture of diffraction gratings.

A further use of the present invention is its applicability as an optical power limiter to protect optical waveguide systems or parts of such systems from catastrophic damage from accidental initiation of a self-propagating structural modification caused by an increase in the optical power being launched into the system.

Figure 14:
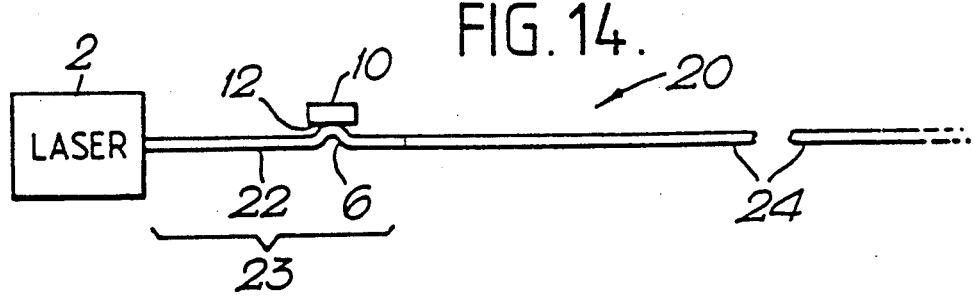
FIGS. 14 and 15 are schematic diagrams of optical circuits protected by optical power limiters according to the present invention.

Referring to FIG. 14, an optical system 20 includes a laser optical power source 2 which launches optical power into a first optical fibre 22 which in turn is optically coupled in series to a second optical fibre 24 connected to some further equipment (not shown). The optical fibre 22 includes an HCB 6 in contact with a substrate 10 with a metal film 12 on the surface of the substrate 10 in contact with the HCD 6, which combination constitutes an optical power limiter 23. The characteristics of the fibres 22 and 24 are chosen such that on raising the optical power launched into the fibre 22 by the laser 2 the metal film 12 will interact with the optical field to initiate a periodic structural modification in the manner described above with reference to FIG. 1 at an optical power less than that which can damage the optical fibre 24 for example by way of an inadvertently initiated and sustained propagating structural modification.

This arrangement therefore acts as a power limiter as the fibre 22 becomes non-transmissive at optical powers above the initiation power so protecting the fibre 24 from inadvertent catastrophic damage. Should the fibre 22 be so damaged only that section of fibre need be replaced to reconnect the laser 2 to the fibre 24.

Figure 15:
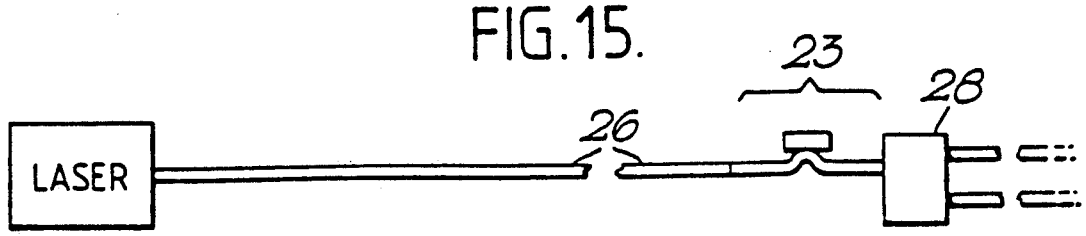

An optical power limiter according to this aspect of the present invention can also be applied to protect devices or waveguides remote from the laser as shown in FIG. 15. A laser 2 launches optical power down an optical fibre 26 to a device to be protected from excess optical power, a switch 28, for example, via an optical power limiter as described with reference to FIG. 14. In this instance the power limiter is arranged to have the periodic restructuring of its core initiated at an optical power less than the damage threshold power of the switch and at an optical power less than is necessary to sustain propagation into the fibre 26. It will be clear that there are other combinations of waveguides or devices that are protectable by optical power limiters according to the present invention.

The invention is not applicable only to the specific embodiments described above but is applicable to any optical waveguide in which the above described propagation of core structural modification is obtainable and to any means of initiating it.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. An optical waveguide network couplable to a source of optical power, said network including a first optical waveguide coupled in series to an optical device, said device having a damage threshold, said first optical waveguide being arranged such that the propagation of a structural modification along the waveguide towards said source of optical power will be initiated and sustained at an optical power below said damage threshold of the optical device.

2. An optical network as claimed in claim 1 in which the optical device is a second optical waveguide.

3. An optical network as claimed in claim 2 in which said damage threshold of the second optical waveguide is the optical power necessary to sustain the propagation of a structural modification along said second waveguide.

4. An optical network as claimed in claim 1 or 3 in which the structural modification is initiated and sustained by launching optical power into the optical waveguide network and raising the temperature of a power of said first optical waveguide.

5. An optical network as claimed in claims 1 or 3 in which the structural modification is initiated and sustained by launching optical power into the optical waveguide network and raising the temperature of a portion of said first optical waveguide wherein said first waveguide is an optical fibre.

6. An optical network as claimed in claims 1 or 3 in which the structural modification is initiated and sustained by launching optical power into the optical waveguide network and raising the temperature of a portion of said first optical waveguide wherein said first waveguide is a monomode optical fibre.

7. An optical network as claimed in claims 1 or 3 in which the structural modification is initiated and sustained by launching optical power into the optical waveguide network and raising the temperature of a portion of said first optical waveguide in which the rise in temperature is caused by a material absorbing the optical power near the first waveguide.

8. An optical network as claimed in claims 1 or 3 in which the structural modification is initiated and sustained by launching optical power into the optical waveguide network and raising the temperature of a portion of said first optical waveguide in which the rise in temperature is caused by placing an absorber at the end of the first waveguide.

9. An optical network as claimed in claims 1 or 3 in which the structural modification is initiated and sustained by launching optical power into the optical waveguide network and raising the temperature of a portion of said first optical waveguide in which the rise in temperature is caused by an externally applied heat source.

10. An optical network as claimed in claims 1 or 3 in which the structural modification is initiated and sustained by launching optical power into the optical waveguide network and raising the temperature of a portion of said first optical waveguide in which the rise in temperature is caused by a fusion splicer.

11. An optical network as claimed in claims 1 or 3 in which the structural modification is initiated and sustained by launching optical power into the optical waveguide network and raising the temperature of a portion of said first optical waveguide in which said source is a mode-locked laser.

12. An optical network couplable to a source of optical power, said network including:
a first optical waveguide coupled in series to an optical device, said device having a damage threshold;
said first optical waveguide being arranged such that the propagation of a structural modification along the waveguide towards said source of optical power will be initiated and sustained at an optical power below said damage threshold of the optical device;
in which the structural modification is initiated and sustained by launching optical power into the optical waveguide network and raising the temperature of a portion of said first optical waveguide in which the rise in temperature is caused by bringing a metal film into contact with a polished half coupler-block so as to cause the metal film to absorb energy from said optical source.

13. An optical network couplable to a source of optical power, said network including:
a first optical waveguide coupled in series to an optical device, said device having a damage threshold;
said first optical waveguide being arranged such that the propagation of a structural modification along the waveguide towards said source of optical power will be initiated and sustained at an optical power below said damage threshold of the optical device;
in which the structural modification is initiated and sustained by launching optical power into the optical waveguide network and raising the temperature of a portion of said first optical waveguide in which said source is a Nd:YAG laser operating at 1.064 $\mu$m.

14. An optical power limiter for use in limiting the level of optical power applied to an optical device having a damage threshold power above which the device is susceptible of permanent damage, said power limiter comprising:
an optical waveguide having a predetermined damage threshold power lower that of said optical device, said waveguide having a core which is periodically spatially interrupted upon passage of optical power in excess of said predetermined damage threshold power; and
means for connecting said optical waveguide in series between said optical device and optical power applied thereto.

15. An optical power limiter as in claim 14 wherein said optical waveguide and said optical device are both optical fibers.

16. An optical waveguide network comprising:
at least one source of optical signal power;
at least one optical signal processing device;
a first optical waveguide having a predetermined damage threshold power; and
a second optical waveguide;
said source and processing device being optically coupled via said first and second optical waveguides, said first optical waveguide being interposed between the source and at least one of the said processing device and the said second optical waveguide so as to protect against application of optical power thereto in excess of said predetermined damage threshold power.

* * * * *